(12) United States Patent  
Zielinski et al.

(10) Patent No.: US 8,400,426 B2
(45) Date of Patent: *Mar. 19, 2013

(54) CAPACITIVE TOUCHPAD AND TOY INCORPORATING THE SAME

(75) Inventors: James Zielinski, Hawthorne, CA (US); Charles H DeVoe, Portland, OR (US)

(73) Assignee: Mattel, Inc., El Segundo, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/324,857

(22) Filed: Dec. 13, 2011

(65) Prior Publication Data

US 2012/0081336 A1    Apr. 5, 2012

Related U.S. Application Data

(63) Continuation of application No. 12/464,614, filed on May 12, 2009, now Pat. No. 8,098,240.

(60) Provisional application No. 61/074,554, filed on Jun. 20, 2008, provisional application No. 61/083,395, filed on Jul. 24, 2008.

(51) Int. Cl.
*G06F 3/045* (2006.01)

(52) U.S. Cl. .................... 345/174; 178/18.01; 178/18.03

(58) Field of Classification Search .......... 345/173–185; 178/18.01–18.09, 19.01–19.06, 20.01–20.04
See application file for complete search history.

(56) References Cited

U.S. PATENT DOCUMENTS

| | | |
|---|---|---|
| 3,232,404 A | 2/1966 | Jones, Jr. |
| 3,519,802 A | 7/1970 | Cinque et al. |
| 3,585,368 A | 6/1971 | Nunamaker |
| 3,632,993 A | 1/1972 | Acker |
| 3,777,165 A | 12/1973 | Bryant et al. |
| 3,790,756 A | 2/1974 | Graves et al. |
| 3,918,028 A | 11/1975 | Humphrey et al. |
| 4,039,940 A | 8/1977 | Butler et al. |
| 4,055,747 A | 10/1977 | Jensen |
| 4,074,114 A | 2/1978 | Dobras |
| 4,090,092 A | 5/1978 | Serrano |
| 4,103,252 A | 7/1978 | Bobick |
| 4,272,916 A | 6/1981 | Giordano et al. |
| 4,334,280 A | 6/1982 | McDonald |

(Continued)

FOREIGN PATENT DOCUMENTS

| | | |
|---|---|---|
| AU | 2007254709 A1 | 1/2008 |
| CA | 2567751 A1 | 12/2005 |

(Continued)

OTHER PUBLICATIONS

TI Texas Instruments Touch & Tell, Prod. No. 1040938-0211-B, Texas Instruments Inc (1981).

(Continued)

*Primary Examiner* — Vijay Shankar
(74) *Attorney, Agent, or Firm* — Kolisch Hartwell, PC (57) ABSTRACT

Capacitive touchpad assemblies, toys including capacitive touchpad assemblies and integral card readers, and methods for detecting contact with a capacitive touch surface are provided. A capacitive touch surface may have a capacity that varies depending on whether it is being contacted by an object such as a human finger. A voltage of the capacitive touch surface may be altered during each of a predetermined number of recurring time intervals. The capacitance of the capacitive touch surface will determine the amount of time required to alter its voltage to a threshold voltage within each time interval. The sum amount of time required for the voltage of the capacitive touch surface to reach the threshold voltage in a predetermined number of time intervals may be used to determine whether the capacitive touch surface is being touched.

20 Claims, 7 Drawing Sheets

U.S. PATENT DOCUMENTS

| | | | |
|---|---|---|---|
| 4,345,167 A | 8/1982 | Calvin | |
| 4,355,300 A | 10/1982 | Weber | |
| 4,359,222 A | 11/1982 | Smith, III et al. | |
| 4,488,679 A | 12/1984 | Bockholt et al. | |
| 4,550,221 A | 10/1985 | Mabusth | |
| 4,595,913 A | 6/1986 | Aubuchon | |
| 4,599,511 A | 7/1986 | Stiller | |
| 4,639,874 A | 1/1987 | Pezaris | |
| 4,687,200 A | 8/1987 | Shirai | |
| 4,700,309 A | 10/1987 | Naito et al. | |
| 4,729,564 A | 3/1988 | Kuna et al. | |
| 4,743,773 A | 5/1988 | Katana et al. | |
| 4,807,296 A | 2/1989 | Ando et al. | |
| 4,818,847 A | 4/1989 | Hara et al. | |
| 4,884,974 A | 12/1989 | DeSmet | |
| 4,890,832 A | 1/1990 | Komaki | |
| 4,916,740 A | 4/1990 | Noda et al. | |
| 4,947,335 A | 8/1990 | Blitchington | |
| 4,952,051 A | 8/1990 | Lovell et al. | |
| 4,969,647 A | 11/1990 | Mical et al. | |
| 4,999,462 A | 3/1991 | Purcell | |
| 5,088,928 A | 2/1992 | Chan | |
| 5,159,181 A | 10/1992 | Bartels et al. | |
| 5,334,022 A | 8/1994 | Kitagawa et al. | |
| 5,352,879 A | 10/1994 | Milch | |
| 5,353,016 A | 10/1994 | Kurita et al. | |
| 5,369,261 A | 11/1994 | Shamir | |
| 5,374,787 A | 12/1994 | Miller et al. | |
| 5,386,219 A | 1/1995 | Greanias et al. | |
| 5,413,518 A | 5/1995 | Lin | |
| 5,471,040 A | 11/1995 | May | |
| 5,511,980 A | 4/1996 | Wood | |
| 5,562,452 A | 10/1996 | Atugi et al. | |
| 5,576,981 A | 11/1996 | Parker et al. | |
| 5,586,042 A | 12/1996 | Pisau et al. | |
| 5,599,046 A | 2/1997 | Behm et al. | |
| 5,601,489 A | 2/1997 | Komaki | |
| 5,682,032 A | 10/1997 | Philipp | |
| 5,709,219 A | 1/1998 | Chen et al. | |
| 5,730,165 A | 3/1998 | Philipp | |
| 5,760,383 A | 6/1998 | Heske, III | |
| 5,760,715 A | 6/1998 | Senk et al. | |
| 5,769,643 A | 6/1998 | Stevens, III | |
| 5,777,596 A | 7/1998 | Herbert | |
| 5,813,861 A | 9/1998 | Wood | |
| 5,831,597 A | 11/1998 | West et al. | |
| 5,844,506 A | 12/1998 | Binstead | |
| 5,851,119 A | 12/1998 | Sharpe, III et al. | |
| 5,853,327 A | 12/1998 | Gilboa | |
| 5,914,477 A | 6/1999 | Wang | |
| 5,920,309 A | 7/1999 | Bisset et al. | |
| 5,933,102 A | 8/1999 | Miller et al. | |
| 5,949,060 A | 9/1999 | Schattschneider et al. | |
| 5,977,867 A | 11/1999 | Blouin | |
| 6,020,849 A | 2/2000 | Fukuzaki et al. | |
| 6,097,189 A | 8/2000 | Arndt et al. | |
| 6,102,397 A | 8/2000 | Lee et al. | |
| 6,105,869 A | 8/2000 | Scharf et al. | |
| 6,157,454 A | 12/2000 | Wagner et al. | |
| 6,168,494 B1 | 1/2001 | Engel et al. | |
| 6,200,216 B1 | 3/2001 | Peppel | |
| 6,202,929 B1 | 3/2001 | Verschuur et al. | |
| 6,227,931 B1 | 5/2001 | Shackelford | |
| 6,260,763 B1 | 7/2001 | Svetal | |
| 6,297,812 B1 | 10/2001 | Obara et al. | |
| 6,327,459 B2 | 12/2001 | Redford et al. | |
| 6,347,813 B1 | 2/2002 | Star et al. | |
| 6,362,737 B1 | 3/2002 | Rodgers et al. | |
| 6,429,846 B2 | 8/2002 | Rosenburg et al. | |
| 6,443,796 B1 | 9/2002 | Shackelford | |
| 6,466,036 B1 | 10/2002 | Philipp | |
| 6,471,565 B2 | 10/2002 | Simeray | |
| 6,572,378 B1 | 6/2003 | Rehkemper et al. | |
| 6,580,600 B2 | 6/2003 | Toyoda et al. | |
| 6,593,755 B1 | 7/2003 | Rosengren | |
| 6,615,155 B2 | 9/2003 | Gilboa | |
| 6,650,867 B2 | 11/2003 | Redford et al. | |
| 6,650,870 B2 | 11/2003 | White et al. | |
| 6,661,239 B1 | 12/2003 | Ozick | |
| 6,676,411 B2 | 1/2004 | Rehkemper et al. | |
| 6,686,908 B1 | 2/2004 | Kobayashi | |
| 6,739,874 B2 | 5/2004 | Marcus et al. | |
| 6,761,315 B2 | 7/2004 | Kato et al. | |
| 6,761,637 B2 | 7/2004 | Weston et al. | |
| 6,772,948 B2 | 8/2004 | Kim | |
| 6,781,577 B2 | 8/2004 | Shigetaka | |
| 6,802,452 B2 | 10/2004 | Lebaschi et al. | |
| 6,803,798 B1 | 10/2004 | Wei et al. | |
| 6,825,833 B2 | 11/2004 | Mulligan et al. | |
| 6,834,251 B1 | 12/2004 | Fletcher | |
| 6,835,131 B1 | 12/2004 | White et al. | |
| 6,937,152 B2 | 8/2005 | Small | |
| 6,940,291 B1 | 9/2005 | Ozick | |
| 6,968,151 B2 | 11/2005 | Redford et al. | |
| 7,006,786 B2 | 2/2006 | Marcus et al. | |
| 7,023,221 B1 | 4/2006 | Lin | |
| 7,081,033 B1 | 7/2006 | Mawle et al. | |
| 7,120,385 B2 | 10/2006 | Marggraff | |
| 7,139,523 B1 | 11/2006 | Lynch et al. | |
| 7,145,552 B2 | 12/2006 | Hollingsworth | |
| 7,148,704 B2 | 12/2006 | Philipp | |
| 7,155,976 B2 | 1/2007 | Kai-Cheng et al. | |
| 7,167,675 B2 | 1/2007 | Lynch et al. | |
| 7,190,356 B2 | 3/2007 | Lin et al. | |
| 7,203,455 B2 | 4/2007 | Ernst et al. | |
| 7,205,776 B2 | 4/2007 | Kinoshita et al. | |
| 7,219,843 B2 | 5/2007 | Havens et al. | |
| 7,224,934 B2 | 5/2007 | Mullen | |
| 7,254,775 B2 | 8/2007 | Geaghan et al. | |
| 7,265,746 B2 | 9/2007 | Knowles et al. | |
| 7,270,266 B2 | 9/2007 | Silverbrook et al. | |
| 7,286,118 B2 | 10/2007 | Van Berkel | |
| 7,328,845 B2 | 2/2008 | Tsai | |
| 7,334,735 B1 | 2/2008 | Antebi et al. | |
| 7,387,560 B2 | 6/2008 | Brumagin et al. | |
| 8,098,240 B2 * | 1/2012 | Zielinski et al. | 345/174 |
| 2002/0121552 A1 | 9/2002 | Kim | |
| 2002/0130848 A1 | 9/2002 | Sims | |
| 2003/0016210 A1 | 1/2003 | Soto et al. | |
| 2003/0067451 A1 | 4/2003 | Tagg et al. | |
| 2003/0162162 A1 | 8/2003 | Marggraff | |
| 2004/0002378 A1 | 1/2004 | Acres et al. | |
| 2004/0002387 A1 | 1/2004 | Grady | |
| 2004/0023705 A1 | 2/2004 | Vernall | |
| 2004/0031851 A1 | 2/2004 | Bianculli et al. | |
| 2004/0104890 A1 | 6/2004 | Caldwell et al. | |
| 2004/0169082 A1 | 9/2004 | Lebaschi et al. | |
| 2004/0219501 A1 | 11/2004 | Small et al. | |
| 2004/0246239 A1 | 12/2004 | Knowles et al. | |
| 2005/0043076 A1 | 2/2005 | Lin | |
| 2005/0048457 A1 | 3/2005 | Ferrigno et al. | |
| 2005/0088416 A1 | 4/2005 | Hollingsworth | |
| 2005/0208458 A1 | 9/2005 | Smith et al. | |
| 2005/0266386 A1 | 12/2005 | Marggraff et al. | |
| 2006/0017702 A1 | 1/2006 | Shen | |
| 2006/0065903 A1 | 3/2006 | Sakurai et al. | |
| 2006/0068860 A1 | 3/2006 | Ueshima et al. | |
| 2007/0091077 A1 | 4/2007 | Lii et al. | |
| 2007/0132733 A1 | 6/2007 | Ram | |
| 2007/0184900 A1 | 8/2007 | Matsumoto et al. | |
| 2007/0291009 A1 | 12/2007 | Wright et al. | |
| 2008/0023553 A1 | 1/2008 | Jones | |
| 2008/0042989 A1 | 2/2008 | Westerman et al. | |
| 2008/0042994 A1 | 2/2008 | Gillespie et al. | |
| 2008/0048997 A1 | 2/2008 | Gillespie et al. | |
| 2008/0129702 A1 | 6/2008 | Mathiassen et al. | |
| 2008/0143689 A1 | 6/2008 | Foo et al. | |
| 2008/0158178 A1 | 7/2008 | Hotelling et al. | |
| 2008/0158198 A1 | 7/2008 | Elias | |
| 2008/0162996 A1 | 7/2008 | Krah et al. | |
| 2010/0175932 A1 * | 7/2010 | Wu | 178/18.06 |
| 2011/0175847 A1 * | 7/2011 | Wang et al. | 345/174 |

FOREIGN PATENT DOCUMENTS

| | | |
|---|---|---|
| DE | 202006013070 | 11/2006 |
| EP | 1603075 | 12/2005 |
| GB | 2275207 | 8/1994 |

| | | |
|---|---|---|
| GB | 2351029 | 12/2000 |
| GB | 2400969 | 10/2004 |
| JP | 03203766 | 9/1991 |
| JP | 11244537 | 9/1999 |
| JP | 2003047771 | 2/2003 |
| JP | 2007095098 A | 4/2007 |
| JP | 2007122326 A | 5/2007 |
| JP | 2007179520 A | 7/2007 |
| WO | 8300255 A1 | 1/1983 |
| WO | 8400075 A1 | 1/1984 |
| WO | 9718546 | 5/1997 |
| WO | 02058807 A1 | 8/2002 |
| WO | 02073587 A1 | 9/2002 |
| WO | 03043709 A1 | 5/2003 |
| WO | 03067553 A1 | 8/2003 |
| WO | 2005088580 A1 | 9/2005 |
| WO | 2005119628 A1 | 12/2005 |
| WO | 2006036851 A2 | 4/2006 |
| WO | 2006038905 A1 | 4/2006 |
| WO | 2006072806 A1 | 7/2006 |
| WO | 2006138596 A1 | 12/2006 |
| WO | 2007017702 A1 | 2/2007 |
| WO | 2007110485 A1 | 10/2007 |
| WO | 2008060641 A2 | 5/2008 |

OTHER PUBLICATIONS

Dictionary of Electronics Capacitive Coupling (1): pp. 98 (1988).
Dictionary of Electronics Capacitive Coupling (2): pp. 100-101 (1988).
Dictionary of Electronics Capacitive Coupling (3): pp. 146-147 (1988).
Dictionary of Electronics Capacitive Coupling (4): pp. 148-149 (1988).
Dictionary of Electronics Capacitive Coupling: pp. 99 (1988).
Joerg Woerner, Datamath Calculator Museum, Texas Instruments Touch and Discover foil contact keyboard, Dec. 20, 2002.
IEEE Standard Dictionary Electronics (1): pp. 928-929 (1993).
19930000 IEEE Standard Dictionary Electronics (2): pp. 838-839 (1993).
Quantum Research Group Ltd. "Qprox: Charge-Transfer Touch Sensor" (1999).
Mattel Catalog Dora the Explorer electronic bingo card reader B0829_1 (Feb. 2003).
Mattel Catalog Dora the Explorer electronic bingo card reader B0829_2. (Feb. 2003).
Mattel Electronic Talking Bingo Koala Brothers card reader with mechanical switches (Feb. 2005).
Robert Grzesek 628Design Darin Barri business card (2005).
Holylite HL5239B Membrane Switch Detector (Nov. 6, 2007).
Sonix USB Audio Contoller Data Sheet, Serial No. 11122APF (Jun. 12, 2008).
CityNews.ca Staff, "Apple Works On Solar Powered iPod While Microsoft Plans Touch Screen PC", (May 28, 2008).
Carl Pickering, "Gesture recognition technology in automobiles", Jaguar and Land Rover Technical Research, Coventry, UK (Jun. 26, 2008).
Gill, John, AVX Ltd., "Basic Tantalum Capacitor Technology" (Sep. 5, 2008).
International Bureau of WIPO, Beate Giffo-Schmitt Authorized Officer; International Preliminary Report on Patentablity for PCT/US2009/043620; Dec. 21, 2010; 6 pages.

* cited by examiner

CAPACITIVE TOUCHPAD AND TOY INCORPORATING THE SAME

CROSS REFERENCE TO RELATED APPLICATIONS

This application is a continuation of U.S. patent application Ser. No. 12/464,614, filed May 12, 2009 and entitled "Capacitive Touchpad and Toy Incorporating the Same," which claims priority under 35 U.S.C. §119(e) to U.S. Provisional Patent Application Nos. 61/074,554, filed on Jun. 20, 2008, and 61/083,395, filed on Jul. 24, 2008, both entitled "Toy with Capacitive Touchpad and Integral Card Reader." The complete disclosures of the above applications are hereby incorporated by reference for all purposes.

FIELD OF THE DISCLOSURE

The present disclosure relates to capacitive touchpad assemblies, as well as computer peripheral devices resembling toys and having components such as input capacitive touchpad assemblies and integral card readers. The touchpads may use capacitive sensors, and haptic feedback may be provided with a piezoelectric device. In some embodiments, limited gesture recognition may be used to improve play value.

Examples of capacitive sensors are disclosed in U.S. Pat. No. 4,039,940, U.S. Pat. No. 4,272,916, U.S. Pat. No. 4,355,300, U.S. Pat. No. 4,595,913, U.S. Pat. No. 5,413,518, U.S. Pat. No. 5,650,597, U.S. Pat. No. 6,661,239, U.S. Pat. No. 6,834,251, U.S. Pat. No. 6,940,291 and Publication No. US20040219501. Examples of piezoelectric devices are disclosed in U.S. Pat. No. 4,334,280, U.S. Pat. No. 6,429,846 and U.S. Pat. No. 6,466,036. Examples of gesture recognition are disclosed in United States Patent Publication Nos. US20060205502, US20060089197, and US20060252494. Examples of card readers are disclosed in U.S. Pat. No. 4,884,974, U.S. Pat. No. 5,334,022, U.S. Pat. No. 7,224,934, U.S. Pat. No. 7,387,560. The disclosures of all the above-referenced patents and publications are incorporated herein by reference.

SUMMARY

Capacitive touchpad assemblies, toys including capacitive touchpad assemblies and, in some cases, integral card readers, and methods for detecting contact with a capacitive touch surface are provided. A capacitive touch surface's capacitance may vary depending on whether an object such as a human finger is in contact with the surface. A voltage of the capacitive touch surface may be altered during each of a predetermined number of recurring intervals. The capacitance of the capacitive touch surface will determine the amount of time required to alter its voltage to a threshold voltage within each interval. The sum amount of time required for the voltage of the capacitive touch surface to reach the threshold voltage in a predetermined number of intervals may be used to determine whether the capacitive touch surface is being touched during that predetermined number of intervals.

DETAILED DESCRIPTION

Figure 1:
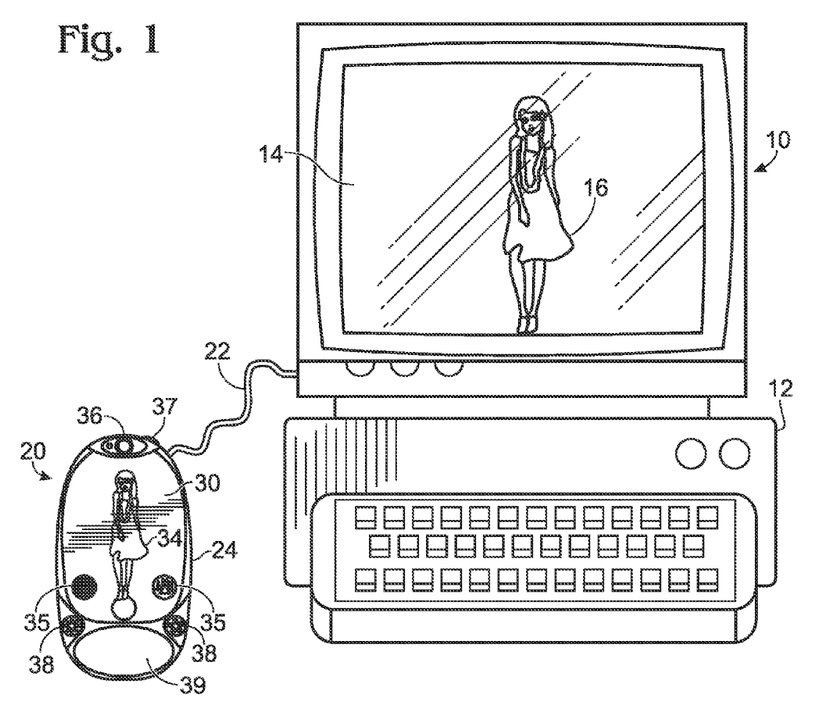
FIG. 1 depicts a toy according to the present disclosure attached to a computer, according to one embodiment of the disclosure.

Referring to the attached drawings, wherein like numerals indicate like elements, there is shown in FIG. 1 a computing device 10 including a keyboard 12 and a monitor 14 displaying an image 16. Computing device 10 also may include any number of other components that are not shown, such as a mouse, a printer, and the like. A peripheral toy 20 may be operably coupled to computing device 10 via an interface 22. Interface 22 may be a wired (e.g., USB or Serial) or wireless (e.g., BlueTooth, RFID, Infrared) connection.

Figure 2:
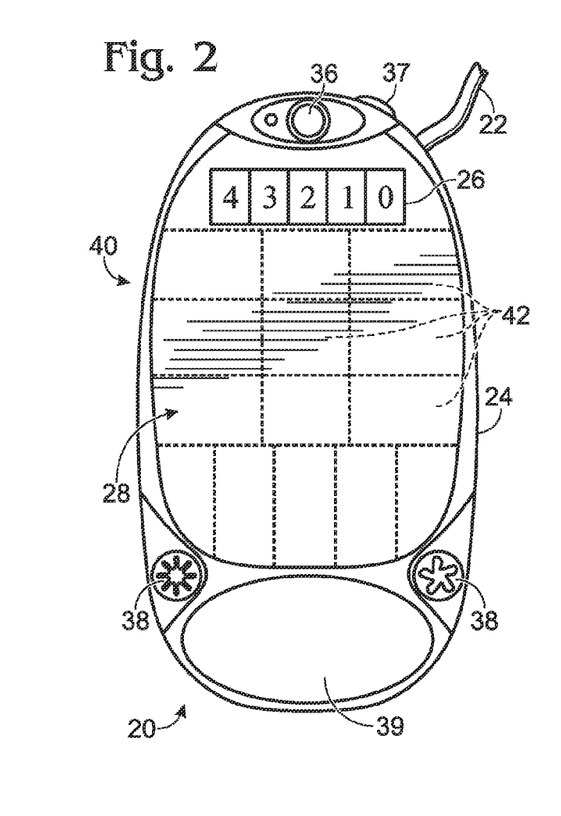
FIG. 2 is a front view of a toy including a capacitive touchpad assembly with a plurality of capacitive touch surfaces, according to one embodiment of the disclosure.
Figure 3:
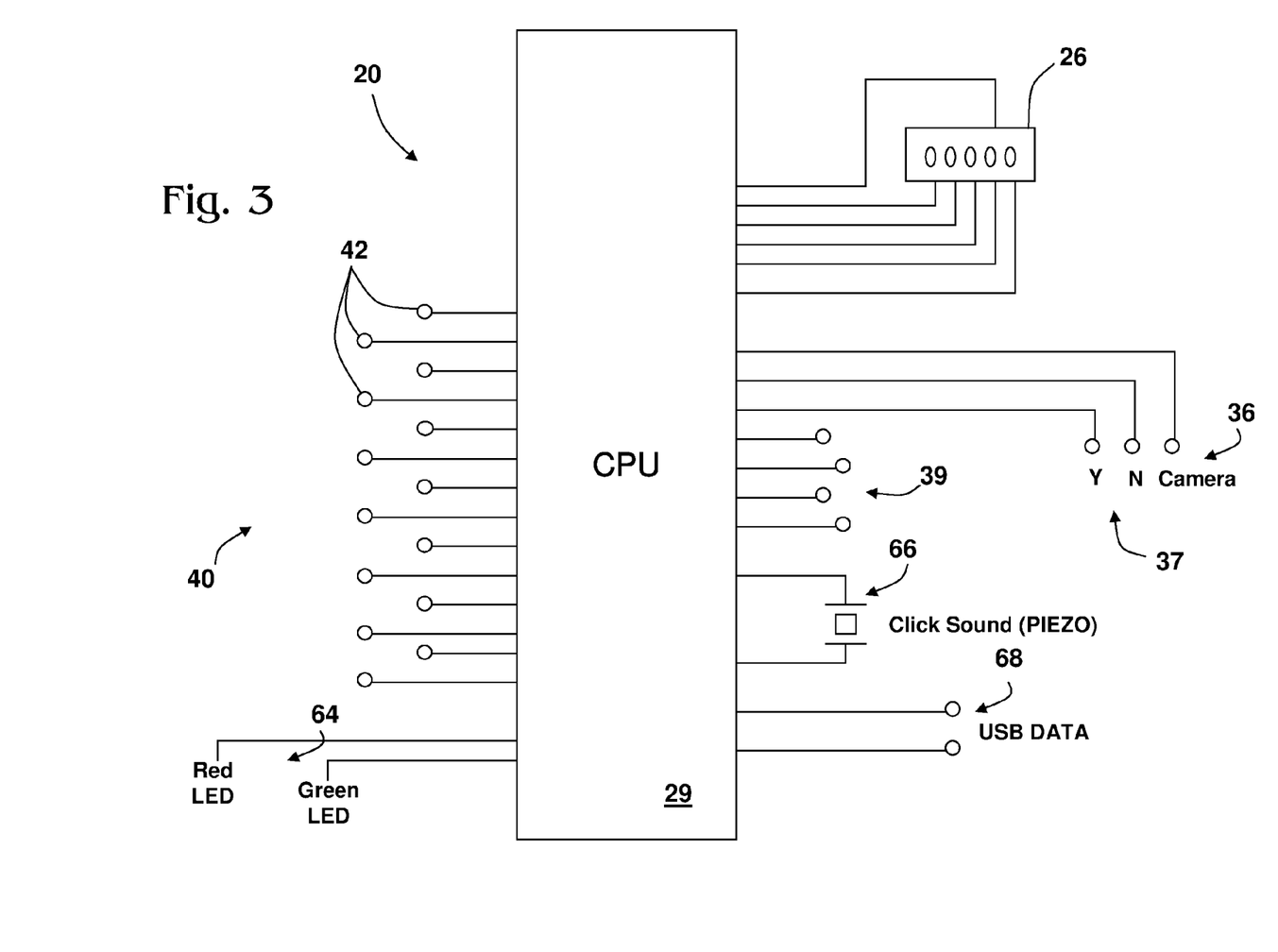
FIG. 3 depicts an example logic circuit for implementing one or more of the embodiments disclosed herein.

As seen in FIG. 2, peripheral toy 20 may include a housing 24 with an integral card reader 26 and a surface 28 adapted to receive one or more portable playing cards 30 (see FIGS. 1, 3 and 5-6). FIG. 3 depicts an example logic circuit that may be implemented in peripheral toys 20 such as those shown in FIGS. 1 and 2. Integral card reader 26 is shown here as a series of optical pickups. Peripheral toy 20 may also include a CPU 29, also referred to as a controller, which may be configured to control the interaction of various components of peripheral toy 20. Additional components will be described further below.

Figure 4:
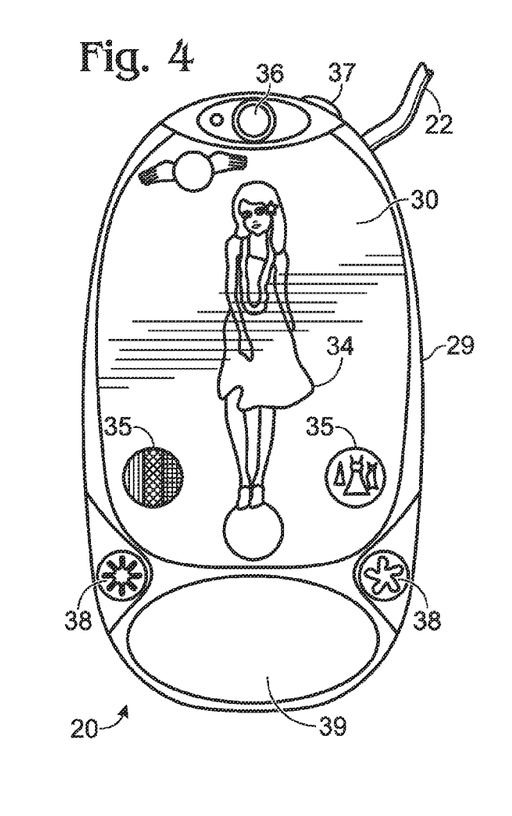
FIG. 4 is a front view of a toy similar to that shown in FIG. 2 with a playing card overlaying the plurality of capacitive touch surfaces, according to one embodiment of the disclosure.
Figure 5:
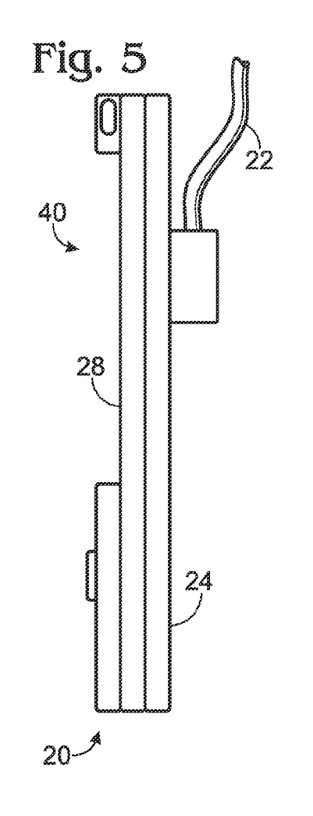
FIG. 5 is a side view of a toy similar to those shown in FIGS. 1-4, according to one embodiment of the disclosure.
Figure 6:
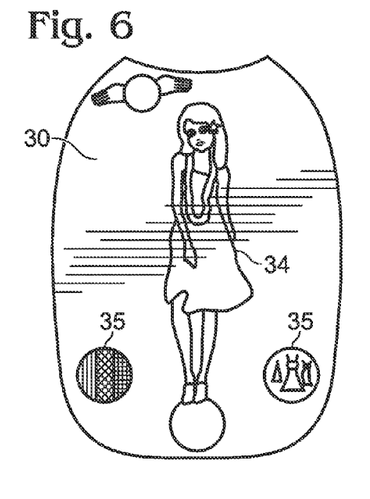
FIGS. 6 and 7 are front and rear views, respectively, of an example playing card usable with devices such as those shown in FIGS. 1-5, according to one embodiment of the disclosure.

As shown in FIG. 4, a user may install one or more portable playing cards 30 onto surface 28 of peripheral toy 20. Integral card reader 26 may read indicia 32 on a surface of playing card 30 (e.g., on the back of playing card 30, as seen in FIG. 6) to obtain identification information about playing card 30. CPU 29 may be configured to receive from integral card reader 26 the playing card identification information and to communicate instructions through interface 22 to computing device 10 to provide an output related to the received identification information.

In some embodiments, identification information about playing card 30 may include information relating to a character 34 depicted on card 30. Placing playing card 30 on surface 28 may cause CPU 29 to instruct computing device 10 to output image 16 (see FIG. 1) appearing similar or being related to the character 34 on computer monitor 14. A user may control image 16 on monitor 14 with peripheral toy 20 by manipulating controls on peripheral toy 20 to cause CPU 29 to send control signals to computing device 10 via interface 22.

While many methods of reading data from playing card 30 may be implemented (e.g., USB, serial, memory card, barcode, RFID), in an exemplary embodiment, each sensor of integral card reader 26 is configured to optically read a single portion of indicia 32 on card 30 to ascertain information about card 30. For example, the example integral card reader 26 shown in FIGS. 2 and 3 includes five sensors representing five binary digits, allowing for 31 permutations or discrete card identities. While the least significant bit in FIG. 2 is shown on the right, this is not intended to be limiting, and it should be understood that the sensors in integral card reader 26 may be in any order.

Figure 7:
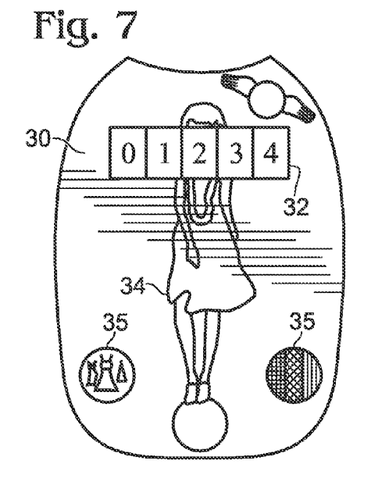

FIGS. 6 and 7 depict the front and back, respectively, of an example playing card 30 compatible with the toy 20 shown in FIGS. 1-5. Indicia 32 are seen in FIG. 7 on the back of card 30 comprising five individual value indicators. Each value indicator may be adapted to be read by a single sensor of integral card reader 26. Each value indicator may be capable of communicating one or more pieces of information. In this example, the most significant bit of indicia 32 is arranged oppositely relative to the most significant bit of the integral card reader 26 so that the most significant bits will line up when the back of card 30 is faced towards integral card reader 26.

As seen in FIGS. 2 and 3, peripheral toy 20 may include additional features, such as a camera 36, camera control buttons 37, other input controls 38, and a four-way directional pad 39. In some embodiments, camera 36 includes an image sensor and lens, allowing photographs to be taken. Alternatively, camera 36 may be a simulation only, but camera control buttons 37 may be used to trigger the display of simulated photographs on computing device 10. Four-way directional pad 39 may be similar to that described in U.S. Pat. No. 4,687,200, the disclosure of which is incorporated herein by reference for all purposes.

Referring back to FIG. 2, peripheral toy 20 may include controls such as a capacitive touchpad assembly 40 comprising one or more capacitive touchpads/touch surfaces 42 disposed on housing 24 of peripheral toy 20, often on surface 28. In some embodiments, each capacitive touch surface 42 is covered by a decorative dielectric material. Contacting a capacitive touch surface 42 with an object such as a human finger modifies the effective capacitance of the capacitive touch surface 42. This modification of capacitance, and hence whether a capacitive touch surface 42 is being touched, may be detected by altering a voltage of the capacitive touch surface 42 and measuring the amount of time required for the capacitive touch surface 42 to reach a threshold voltage.

Playing card 30 may be constructed of materials chosen so that placement of card 30 on surface 28 will not interfere with the operation of capacitive touchpad assembly 40. For example, capacitive touch surface 42 may be configured to detect touching through playing card 30.

Card 30 also may be usable to improve the usability of capacitive touchpad assembly 40. For example, card 30 may include one or more control area indicators 35 that indicate a particular portion of card 30 that will overlay a particular capacitive touch surface 42. The underlying capacitive touch surface 42 may cause computing device 10 to alter output image 16 in a manner that is related to what is depicted in the particular control area indicator 35. For example, in FIG. 6, card 30 includes control area indicator 35 depicting clothing.

When card 30 is installed on toy 20, CPU 29 may be configured to alter the clothing of character output 16 when the capacitive touch surface 42 underlying this control area indicator 35 is touched.

Figure 8:
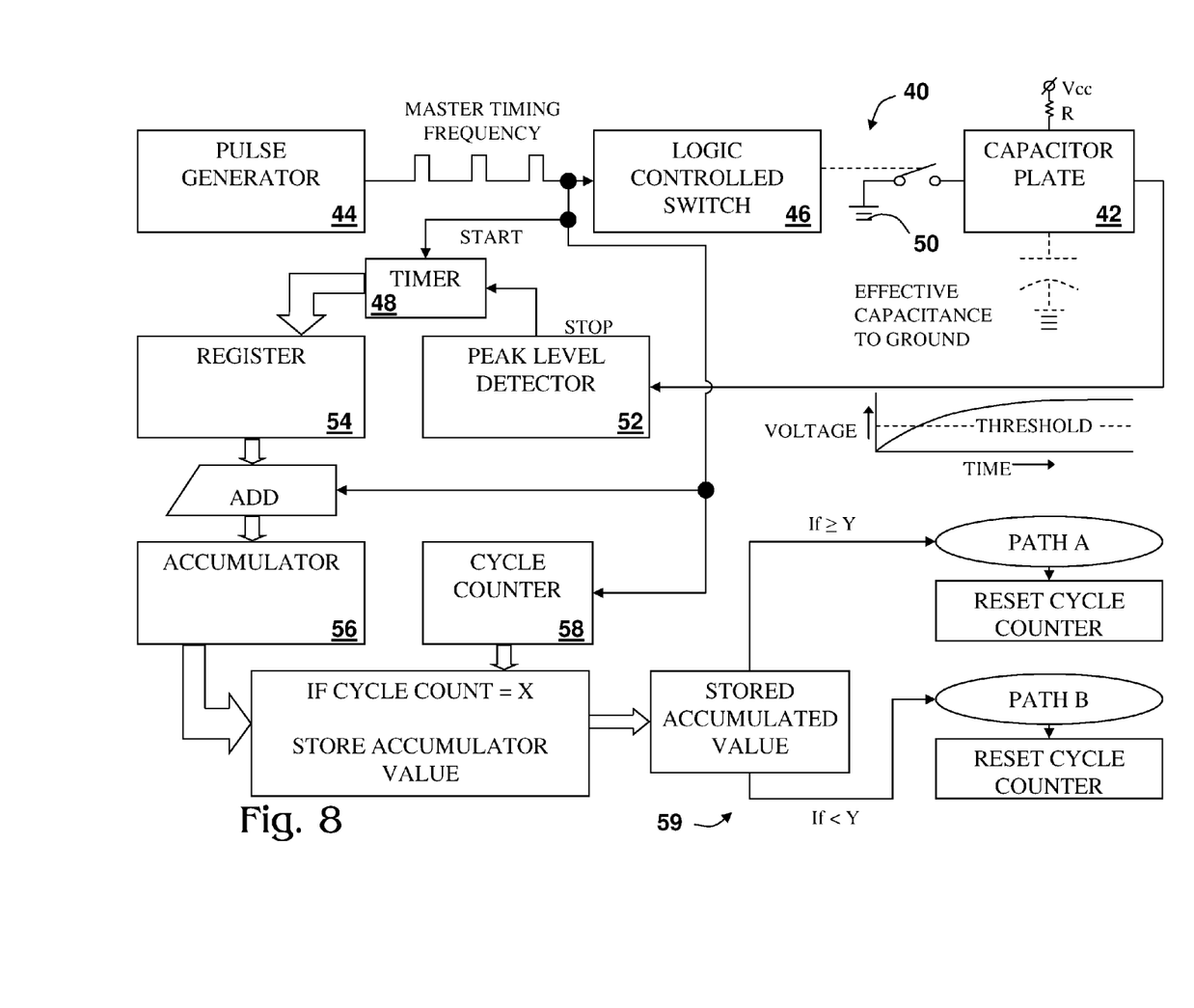
FIG. 8 depicts example circuit logic for detecting whether a capacitive touch surface is being touched, according to one embodiment of the disclosure.

FIG. 8 illustrates example circuit logic for monitoring the capacitance of capacitive touch surface 42, and hence whether capacitive touch surface 42 is being touched Repeatedly, capacitive touch surface 42 is charged at least until its voltage reaches a predetermined threshold value, and the time required to reach the predetermined charge threshold in each instance is measured. Capacitive touch surface 42 is connected to a power source Vcc. A pulse generator or clock 44 generates pulses, and in many cases timing pulses, to a logic-controlled switch 46 to define recurring intervals. The pulses are also provided to a timer 48. Logic-controlled switch 46 may be a microchip, an ASIC or other similar circuitry, and may be configured to open and close a connection between capacitive touch surface 42 and ground 50 to alter a voltage of capacitive touch surface 42.

Connection to ground 50 discharges capacitive touch surface 42 quickly, particularly where little to no resistance exists between capacitive touch surface 42 and ground 50. However, as will be seen in other embodiments described below, a resistor may be included between capacitive touch surface 42 and ground 50 to cause the discharge of capacitive touch surface 42 to be more gradual.

Figure 9:
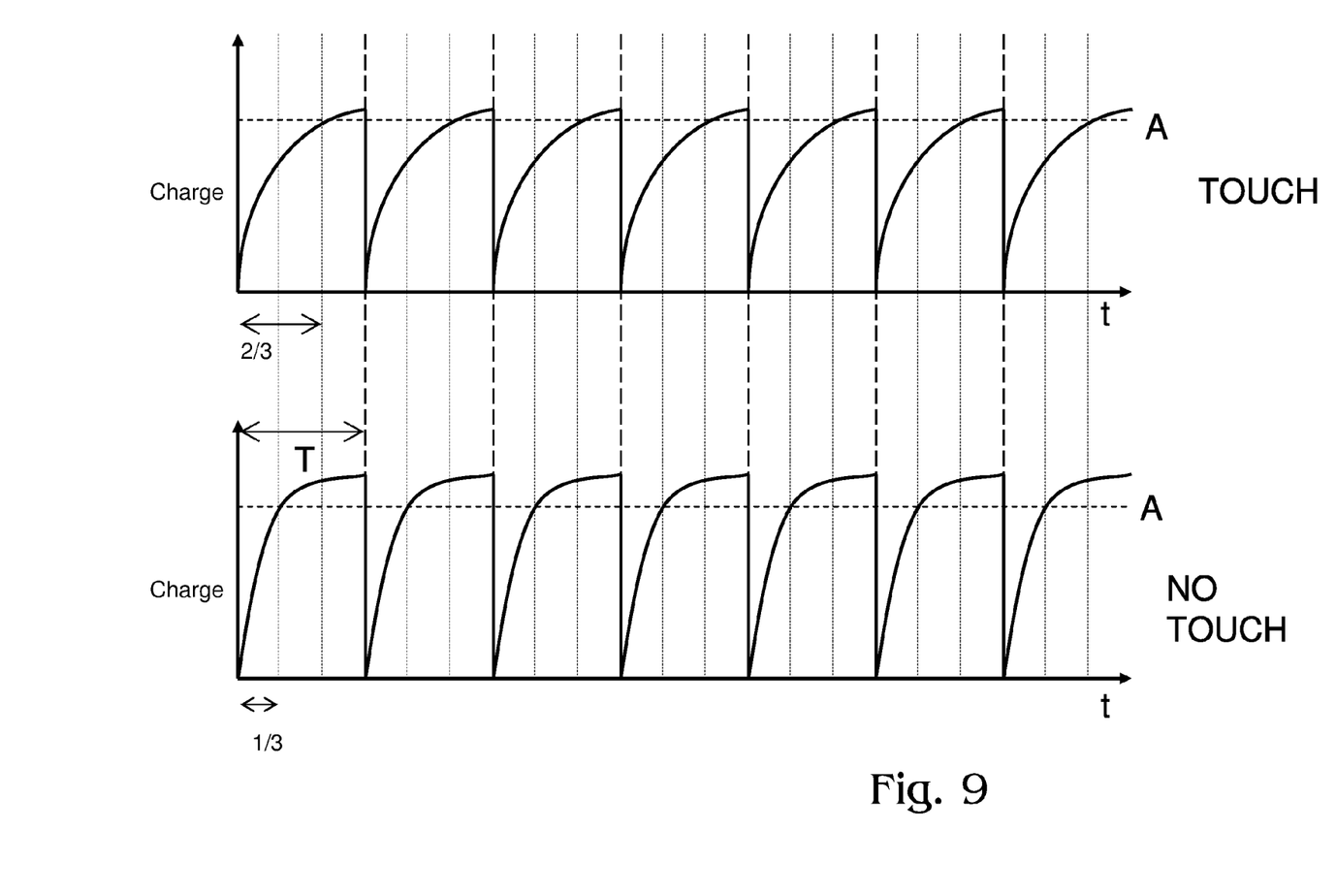
FIG. 9 depicts two charts showing the differences in capacitance as a function of time between a capacitive touch surface being touched and not being touched, in a capacitive touchpad assembly incorporating the circuit logic of FIG. 8.

A peak level detector 52 is coupled to capacitive touch surface 42 and is configured to detect, and indicate to timer 48, when the voltage of capacitive touch surface 42 reaches the threshold voltage (indicated by dotted line A in FIG. 9). Accordingly, timer 48 may be configured to capture or measure the time required to charge capacitive touch surface 42 to the threshold voltage. Timer 48 may be started based on output from pulse generator 44 (e.g., at the beginning of each interval T, which typically would be a time interval) and stopped at the instruction of peak level detector 52 (i.e., when the threshold voltage is reached). When timer 48 stops, it may store the measured time in a register 54, and the measured time may be added to a sum of captured times contained in an accumulator 56.

Timer 48 may measure times during a predetermined number of intervals, or in other words, during a sample. A cycle counter 58 may track intervals in order to control sample size. For example, if a sample size is to be X intervals T, cycle counter 58 increments X times, during which time accumulator 56 accumulates X measured charge times from timer 48. Once X cycles pass, the sample is complete.

Once a sample is complete, the sum value in accumulator 56 may be stored and accumulator 56 may be reset to zero. Using control circuitry implementing logic indicated generally at 59, the sum value from accumulator 56 then may be compared to a predetermined value or threshold Y. If it is above (or in some cases, greater than or equal to) the threshold Y, then it may be determined in Path A that capacitive touch surface 42 was being touched during the sample. If the stored accumulator value is below the threshold Y, then it may be determined in Path B that capacitive touch surface 42 was not being touched during the sample.

Example results of the circuit logic shown in FIG. 8 are depicted graphically in FIG. 9. A sample where capacitive touch surface 42 is being touched is shown in the top graph labeled "TOUCH." Because capacitive touch surface 42 is being touched, its capacitance is higher. Accordingly, more of an interval, e.g., ⅔ of an interval T, may be required to charge capacitive touch surface 42 to the threshold voltage indicated by dotted line A.

An example where capacitive touch surface 42 is not being touched is shown in the bottom graph of FIG. 9 labeled "NO TOUCH." Because the capacitance of capacitive touch surface 42 is lower when it is not being touched, less of an interval, e.g., only ⅓ of an interval T, may be required to charge capacitive touch surface 42 to the threshold voltage indicated by dotted line A.

Continuing with the logic of FIG. 8 and referring also to FIG. 9, for each interval T, ⅔ is added to accumulator 56 when the capacitive touch surface 42 is being touched and ⅓ is added to accumulator 56 when the capacitive touch surface 42 is not being touched. Assuming a sample size of 9 intervals T (only 7 intervals are shown in FIG. 9), if the total sum in accumulator 56 is greater than or equal a predetermined value (e.g., 6), then capacitive touch surface 42 may be considered to be touched for that sample. In such a case, control circuitry implementing the logic indicated generally at 59, which may include one or more of the components described herein, may produce a signal indicative of the capacitive touch surface 42 being touched. Likewise, if the total sum in accumulator 56 is less than a predetermined value (e.g., less than 6), then capacitive touch surface 42 may be considered untouched for that sample, and the control circuitry may produce a signal indicative of such.

At the end of each interval T and/or the beginning of the next interval T+1, the charging of capacitive touch surface 42 may cease and capacitive touch surface 42 may be connected to ground 50 to discharge its voltage, immediately prior to its being charged again. This creates a break in time between the charges of capacitive touch surface 42 that makes a sample readily observable using an oscilloscope. This also makes the determination of whether capacitive touch surface 42 is being touched entirely independent of any frequency of a signal, as the recurring intervals from clock 44 assure a constant frequency.

Figure 10:
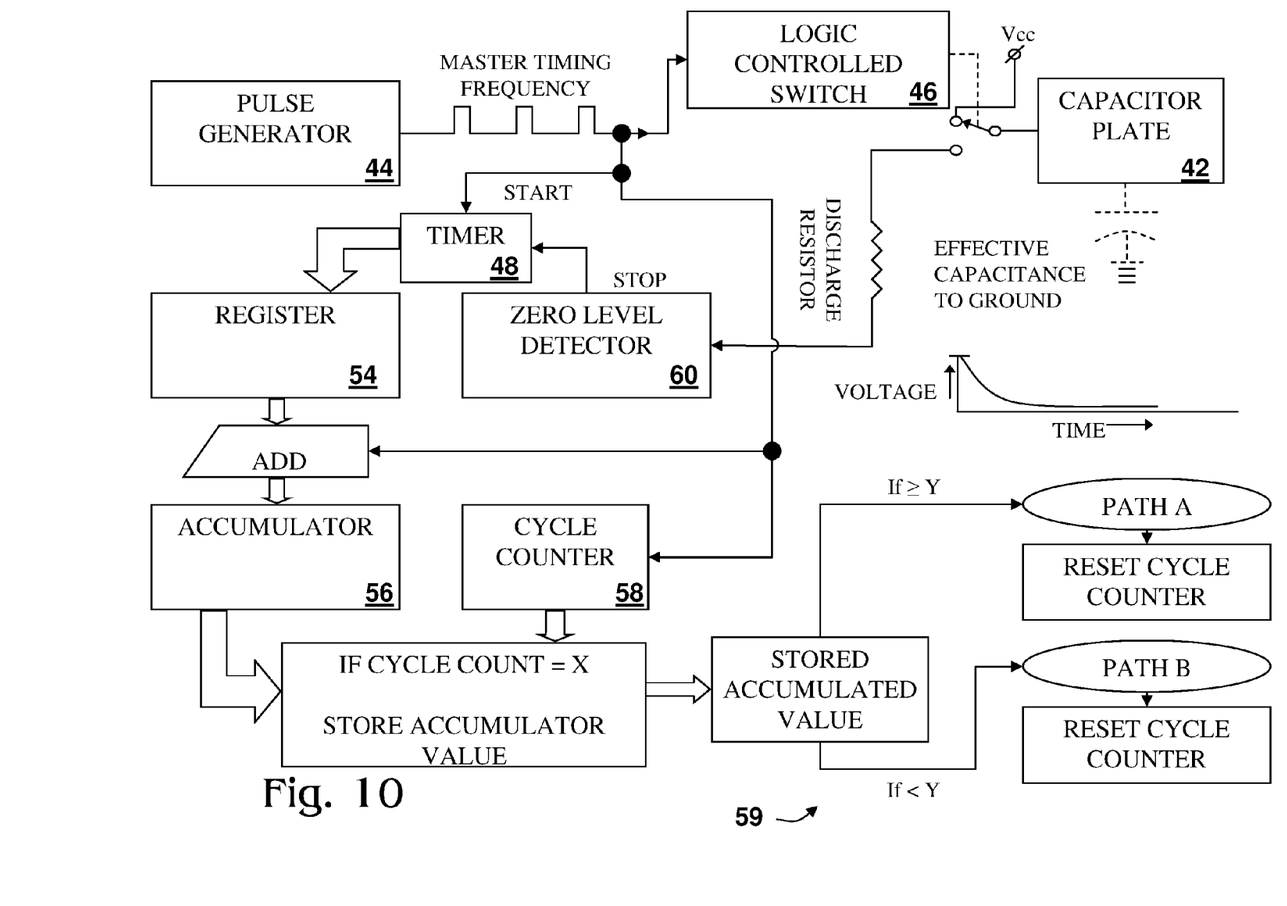
FIG. 10 depicts alternative circuit logic for detecting whether a capacitive touch surface is being touched, according to one embodiment of the disclosure.

Alternative circuit logic is depicted in FIG. 10. This embodiment is similar to the one shown in FIG. 8 except that instead of measuring the time required to charge capacitive touch surface 42 to a threshold voltage, this embodiment measures the time required to discharge capacitive touch surface 42 to a threshold voltage.

At the beginning of each interval T and immediately prior to capacitive touch surface 42 being discharged, timer 48 is set to zero and logic-controlled switch 46 connects capacitive touch surface 42 to a power supply Vcc for either a predetermined amount of time or until a predetermined charge (labeled B in FIG. 11) is reached. Once capacitive touch surface 42 is charged, logic-controlled switch 46 disconnects capacitive touch surface 42 from the power supply Vcc so that the voltage of capacitive touch plate 42 is gradually discharged through a discharge resistor.

In FIG. 10, a zero level detector 60 is connected to capacitive touch surface 42 to detect when the voltage of the capacitive touch surface 42 drops to zero. Once this happens, zero level detector 60 instructs timer 48 to stop. Accordingly, the time measured by timer 48 is the time required to charge capacitive touch surface 42, plus the time required to discharge the voltage of capacitive touch surface 42 to zero. As was the case above, the sum of the measured times for a sample are accumulated in accumulator 56. The remaining logic may be identical to that shown in FIG. 8. Although a zero level detector 60 is shown in FIG. 10, indicating a predetermined threshold value of zero, it should be understood that other non-zero predetermined threshold values may also be selected.

Figure 11:
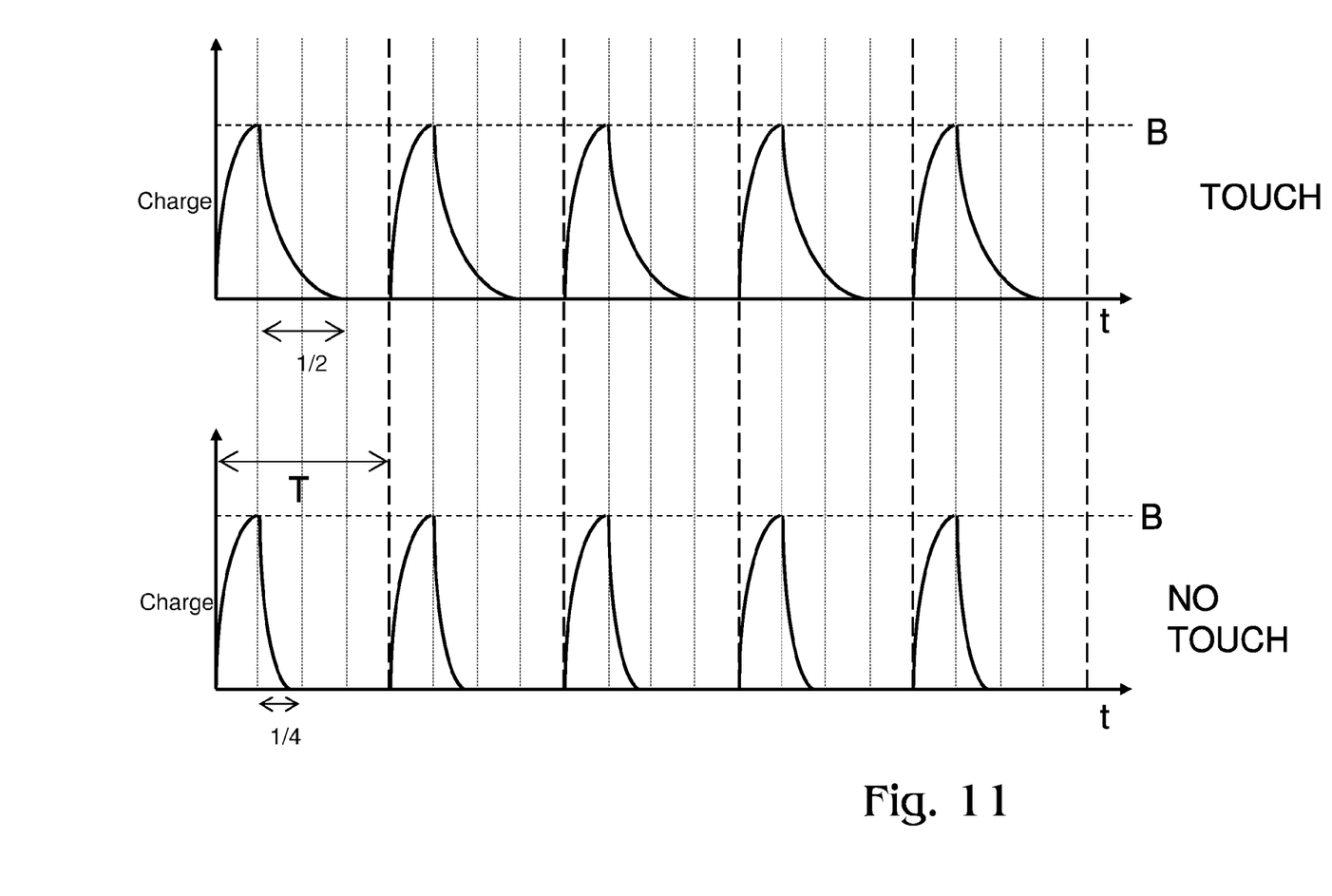
FIG. 11 depicts two charts showing the differences in capacitance as a function of time between a capacitive touch surface being touched and not being touched, in a capacitive touchpad assembly incorporating the circuit logic of FIG. 10.

Example results of the logic circuit shown in FIG. 10 are depicted graphically in FIG. 11. A sample where a capacitive touch surface 42 is being touched is shown in the top graph of FIG. 11 labeled "TOUCH." Because capacitive touch surface 42 is being touched, its capacitance is higher, which means more time is required for it to discharge. In this case, ½ of an interval T is required to discharge capacitive touch surface 42 to zero. In the bottom graph of FIG. 11 labeled "NO TOUCH", capacitive touch surface 42 is not being touched, making its capacitance lower and decreasing the time required for it to discharge. In this case, ¼ of an interval T is required to discharge capacitive touch surface 42 to zero.

Assuming a sample size of 5 intervals T, the amount of time accumulated in accumulator 56 may be compared to a threshold of Y=2.5. If the accumulated time is greater than or equal to 2.5 (½×5=2.5), then it may be determined that capacitive touch surface 42 is being touched. In such a case, the control circuitry implementing the logic indicated at 59 may produce a signal indicative of the capacitive touch surface 42 being touched. If the accumulated time is less than 2.5 (¼×5=1.25), then it may be determined that the capacitive touch surface 42 is not being touched, and the control circuitry may produce a signal indicating as much. It should be understood that the threshold to which the accumulated time is compared may be adjusted upwards or downwards, decreasing or increasing, respectively, the sensitivity of capacitive touch surface 42.

In some embodiments, a signal communicated from peripheral toy 20 to computing device 10 via interface 22 may utilize one or more communication or electronic protocols. For example, actions taken using capacitive touchpad assembly 40 or other controls on peripheral toy 20 may be transmitted to computing device 10 in a format such as USB. In some embodiments, software executing on computing device 10 may be operated even without toy 20 (where toy 20 is lost or damaged) using another USB input device. The following list contains an example set of USB keystrokes that may be mapped to various capacitive touchpads on toy 20.

Up=Alt_Up Arrow=E2h OR E6h AND 52h Usage ID
Dn=Alt_Down Arrow=E2h OR E6h AND 51h Usage ID
Rt=Alt_Right Arrow=E2h OR E6h AND 4Fh Usage ID
Lt=Alt_Left Arrow=E2h OR E6h AND 50h Usage ID
Camera=Alt_Spacebar=E2h OR E6h AND 2Ch Usage ID
Yes=Alt_Enter=E2h OR E6h AND 28h Usage ID
No=Alt_Backspace=E2h OR E6h AND 2Ah Usage ID
Sw01=Alt_Q=E2h OR E6h AND 14h Usage ID
Sw02=Alt_W=E2h OR E6h AND 1Ah Usage ID
Sw03=Alt_E=E2h OR E6h AND 08h Usage ID
Sw04=Alt_R=E2h OR E6h AND 15h Usage ID
Sw05=Alt_T=E2h OR E6h AND 17h Usage ID
Sw06=Alt_Y=E2h OR E6h AND 1Ch Usage ID
Sw07=Alt_A=E2h OR E6h AND 04h Usage ID
Sw08=Alt_S=E2h OR E6h AND 16h Usage ID
Sw09=Alt_D=E2h OR E6h AND 07h Usage ID
Sw10=Alt_F=E2h OR E6h AND 09h Usage ID
Sw11=Alt_G=E2h OR E6h AND 0Ah Usage ID
Sw12=Alt_Z=E2h OR E6h AND 1Dh Usage ID
Card01=Alt__1=E2h OR E6h AND 1Eh Usage ID
Card02=Alt__2=E2h OR E6h AND 1Fh Usage ID
Card03=Alt__3=E2h OR E6h AND 20h Usage ID
Card04=Alt__4=E2h OR E6h AND 21h Usage ID
Card05=Alt__5=E2h OR E6h AND 22h Usage ID
Card06=Alt__6=E2h OR E6h AND 23h Usage ID
Card07=Alt__7=E2h OR E6h AND 24h Usage ID
Card08=Alt__8=E2h OR E6h AND 25h Usage ID
Card09=Alt__9=E2h OR E6h AND 26h Usage ID
Card10=Alt__0=E2h OR E6h AND 27h Usage ID
Card11=Alt_U=E2h OR E6h AND 18h Usage ID
Card12=Alt_P=E2h OR E6h AND 13h Usage ID
Card13=Alt_H=E2h OR E6h AND 0Bh Usage ID Card14=Alt_J=E2h OR E6h AND 0Dh Usage ID
Card15=Alt_K=E2h OR E6h AND 0Eh Usage ID
Card16=Alt_L=E2h OR E6h AND 0Fh Usage ID
Card17=Alt_N=E2h OR E6h AND 11h Usage ID
Card18=Alt_M=E2h OR E6h AND 10h Usage ID
Card19=Alt_<=E2h OR E6h AND 36h Usage ID
Card20=Alt_>=E2h OR E6h AND 37h Usage ID While embodiments of a toy and associated computer systems and methods of use have been particularly shown and described, many variations may be made therein. This disclosure may include one or more independent or interdependent embodiments directed to various combinations of features, functions, elements and/or properties. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A capacitive touchpad assembly comprising:
a capacitive touch surface;
a pulse generator configured to provide pulses defining recurring intervals;
a logic-controlled switch for altering a voltage of the capacitive touch surface during each interval until the voltage of the capacitive touch surface reaches a threshold voltage;
a timer configured to measure the time required for the voltage of the capacitive touch surface to reach the threshold voltage in each interval;
an accumulator configured to accumulate the times measured by the timer during a predetermined number of intervals; and
control circuitry configured to produce a signal indicative of the capacitive touch surface being touched where the accumulated time is greater than a predetermined value.

2. The capacitive touchpad assembly of claim 1, wherein altering the voltage of the capacitive touch surface includes charging the capacitive touch surface at least until the voltage of the capacitive touch surface rises to the threshold voltage.

3. The capacitive touchpad assembly of claim 2, wherein altering the voltage of the capacitive touch surface further includes discharging the capacitive touch surface at the beginning of each interval immediately prior to charging the capacitive touch surface.

4. The capacitive touchpad assembly of claim 1, wherein altering the voltage of the capacitive touch surface includes discharging the capacitive touch surface at least until the voltage of the capacitive touch surface drops to the threshold voltage.

5. The capacitive touchpad assembly of claim 4, wherein the threshold voltage is zero.

6. The capacitive touchpad assembly of claim 4, further comprising a resistor through which the voltage of the capacitive touch surface is gradually discharged.

7. The capacitive touchpad assembly of claim 4, wherein altering the voltage of the capacitive touch surface further includes charging the capacitive touch surface at the beginning of each interval immediately prior to discharging the capacitive touch surface.

8. The capacitive touch assembly of claim 1, further comprising a housing having a surface adapted to receive a playing card, wherein the capacitive touch surface is formed on the surface adapted to receive a playing card, and the capacitive touch surface is configured to detect touching through the playing card.

9. A method of detecting contact with a capacitive touch surface comprising:
providing pulses to define recurring intervals;
altering a voltage of the capacitive touch surface during each interval until the voltage of the capacitive touch surface reaches a threshold voltage;
measuring the time required for the voltage of the capacitive touch surface to reach the threshold voltage in each interval;
accumulating the times measured during a predetermined number of intervals; and
indicating that the capacitive touch surface is being touched where the accumulated time is greater than a predetermined value.

10. The method claim 9, wherein altering the voltage of the capacitive touch surface includes charging the capacitive touch surface at least until the voltage of the capacitive touch surface rises to the threshold voltage.

11. The method of claim 10, wherein altering the voltage of the capacitive touch surface further includes discharging the capacitive touch surface at the beginning of each interval immediately prior to charging the capacitive touch surface.

12. The method of claim 9, wherein altering the voltage of the capacitive touch surface includes discharging the capacitive touch surface at least until the voltage of the capacitive touch surface drops to the threshold voltage.

13. The method of claim 12, wherein the threshold voltage is zero.

14. The method of claim 12, wherein discharging the capacitive touch surface includes discharging the capacitive touch surface gradually through a resistor.

15. The method of claim 12, wherein altering the voltage of the capacitive touch surface further includes charging the capacitive touch surface at the beginning of each interval immediately prior to discharging the capacitive touch surface.

16. A capacitive touchpad assembly comprising:
a capacitive touchpad;
a clock configured to provide recurring time intervals;
control circuitry configured to perform the following steps for a predetermined number of time intervals:
alter a voltage of the capacitive touchpad until the voltage of the capacitive touchpad reaches a threshold voltage;
measure the time required for the voltage of the capacitive touchpad to reach the threshold voltage;
accumulate the measured time;
wherein upon completion of the predetermined number of time intervals, the control circuitry is further configured to indicate contact with the capacitive touchpad where the accumulated time is greater than a threshold value.

17. The capacitive touchpad assembly of claim 16, wherein altering the voltage of the capacitive touchpad includes charging the capacitive touchpad until the voltage of the capacitive touchpad rises to the threshold voltage.

18. The capacitive touchpad assembly of claim 17, wherein altering the voltage of the capacitive touchpad further includes discharging the capacitive touchpad at the beginning of each time interval immediately prior to charging the capacitive touchpad.

19. The capacitive touchpad assembly of claim 16, wherein altering the voltage of the capacitive touchpad includes discharging the capacitive touchpad until the voltage of the capacitive touchpad drops to the threshold voltage.

20. The capacitive touchpad assembly of claim 19, wherein altering the voltage of the capacitive touchpad further includes charging the capacitive touchpad at the beginning of each time interval immediately prior to discharging the capacitive touchpad.

* * * * *